Feb. 6, 1968   R. NEUSCHOTZ   3,367,383
FASTENER WITH SELF-ALIGNING THREADED ELEMENT
Filed March 7, 1966
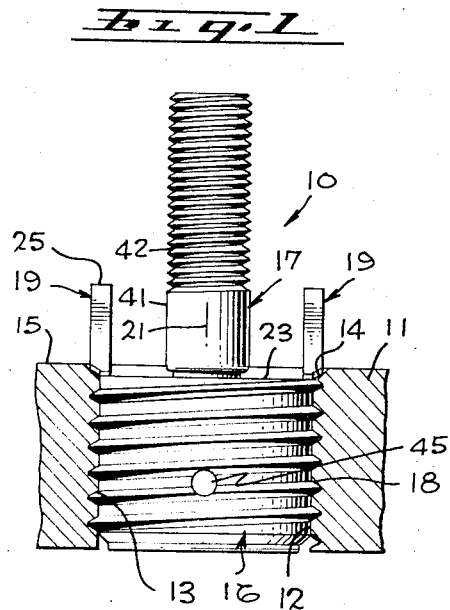
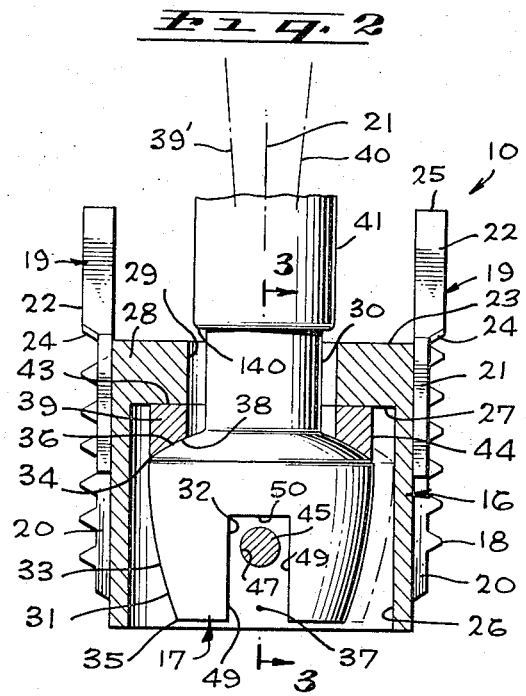
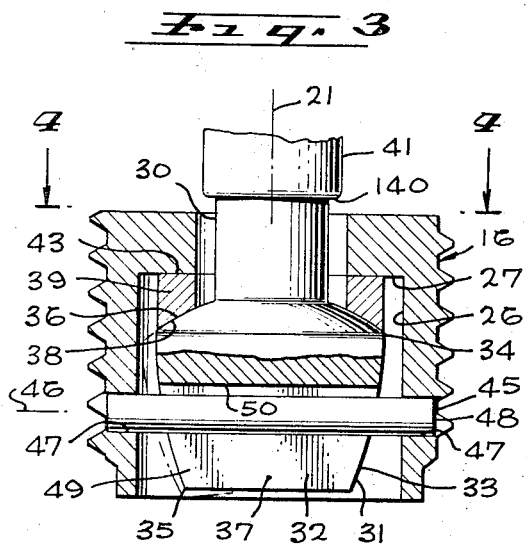
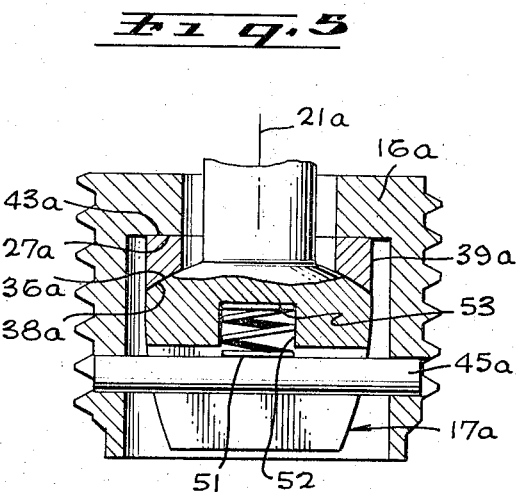
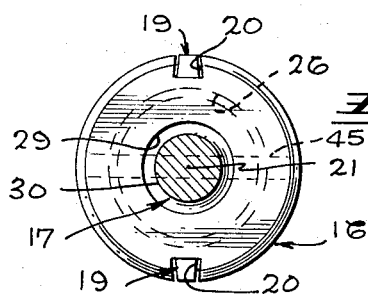
INVENTOR.
ROBERT NEUSCHOTZ
BY William P. Green
ATTORNEY

United States Patent Office 3,367,383
Patented Feb. 6, 1968

3,367,383
FASTENER WITH SELF-ALIGNING
THREADED ELEMENT
Robert Neuschotz, 1162 Angelo Drive,
Beverly Hills, Calif. 90210
Filed Mar. 7, 1966, Ser. No. 532,421
4 Claims. (Cl. 151—41.7)

ABSTRACT OF THE DISCLOSURE

A fastener assembly including a self-aligning threaded element carried by an outer body and free for both lateral shifting movement and universal pivotal or tilting movement, with the threaded element being retained against rotation by engagement with a pin disposed generally transversely across the interior of the body and connected at its opposite ends to a side wall of the body.

---

This invention relates to an improved type of threaded fastener, to be connected into a carrier part or parent material, and having threads engageable with another member for connecting that member to the carrier part through the medium of the fastener.

The general object of the invention is to provide a fastener assembly of this general type which has a threaded element mounted for a universal type of shifting movement, relative to an outer body of the device, so that the element and its threads may be swung or tilted into alignment with a mating part in any of numerous different orientations. Preferably, the threaded element, which may take the form of an outwardly projecting externally threaded stud, is mounted for both the discussed type of swinging or tilting movement, and also bodily lateral shifting movement transversely of the axis of the threads, so that the element is completely self aligning and floating for automatic alignment of its axis with the mating part within a wide range of tolerances. At the same time, the assembly is so constructed as to effectively transmit axial load forces from the threaded element to the outer body of the device, preferably entirely about the axis of the element or threads, in any of the numerous self aligned positions to which the element is shiftable.

The universal titlting movement is attained by providing shoulders associated with the outer body and the threaded element and which are interengageable to transmit axially outward load forces from the element to the body, but with at least one of these shoulders being curved essentially spherically in a manner enabling transmission of axially outward load forces between the parts in any of numerous different relative angular or tilted positions. For best results, both of the interengaging surfaces are spherically curved, to thus provide a substantial area of contact at the shoulders in any of the various adjusted positions.

For enabling transverse shifting movement of the threaded element in addition to tilting movement, there may be provided between the threaded element and body another part for transmitting axial load forces, with this part so engaging the threaded element and body as to allow for both universal and transverse movement therebetween.

In conjunction with the self-aligning threaded element, I provide means for preventing rotation of that element relative to the outer body, to thus transmit rotary load forces from the element to the body, without interfering with the free shifting movement of the threaded element in self aligning manner. A preferred arrangement for thus restraining the threaded element against rotation is similar to that shown and claimed in my co-pending application S.N. 532,434, filed March 7, 1966, on "Self-Aligning Threaded Stud." More particularly, I may employ for transmitting the rotary load forces a pin disposed transversely across the interior of the outer body of the device, and contacting the shiftable threaded element in torque transmitting relation. This pin may extend through a passage formed in an enlarged inner portion of the threaded element, to engage surfaces of the element defining that passage in a relation transmitting rotary forces and preferably also retaining the element against axially inward removal from the outer body.

The above and other features and objects of the invention will be better understood from the following detailed description of the typical embodiment illustrated in the accompanying drawing, in which:

FIG. 1 is a side view of the self-aligning and floating stud assembly constructed in accordance with the invention, shown positioned within a carrier part;

FIG. 2 is an enlarged fragmentary axial section through the device of FIG. 1, with the shiftable element being shown in elevation;

FIG. 3 is a section taken on line 3—3 of FIG. 2;

FIG. 4 is a section on line 4—4 of FIG. 3; and

FIG. 5 shows a variation of the invention.

In FIG. 1, I have shown at 10 a self-aligning and floating stud assembly constructed in accordance with the invention, and shown mounted within a carrier part 11. This carrier part contains a passage 12 having internal threads 13 into which the stud assembly 10 is connected, and having a countersink 14 at the outer end of the threads adjacent transverse outer surface 15 of the carrier part.

The stud assembly 10 includes a hollow essentially tubular outer body 16 (see FIG. 2) within which there is shiftably mounted a self-aligning stud 17. Externally, body 16 has threads 18 constructed and dimensioned to screw into the internal threads 13 of the carrier part. The body 16 is adapted to be locked in the carrier part and against unscrewing rotation therefrom by means of two keys 19, of the general type shown and claimed in my U.S. Patent No. 2,855,970. These keys are frictionally retained within two axially extending grooves 20 which are formed in the outer surface of body at diametrically opposite locations, and which extend through and interrupt threads 18 of the body. Grooves 20 are parallel to main axis 21 of body 16 and its threads 18, and have the dovetail or undercut cross section illustrated in FIG. 4 to confine the keys against radially outward movement from the grooves. Each key has an axially inner portion 21 which is radially very thin, to be received substantially entirely within the minor diameter threads 18, so that the body may be screwed into carrier part 11 without interference being offered by portions 21 of the keys. The axially outer portions 22 of the keys, which project outwardly beyond transverse end surface 23 of the body, are radially thicker, to form shoulders 24 at their inner extremities which are engageable with countersink 14 to limit the extent to which the body may be screwed into the carrier part. After the body has been screwed to the position of FIG. 1, the keys are driven axially inwardly until the end surfaces 25 of the keys are substantially flush with surface 23, so that portions 22 of the keys cut into and through the material of the carrier part and their threads in a manner effectively locking the body against unscrewing rotation from the carrier part.

Internally, tubular body 16 may have a cylindrical inner surface 26 centered about axis 21 and terminating upwardly at a transverse annular shoulder surface 27 which is perpendicular to axis 21 and which is formed on the axially inner side of a radially inwardly projecting annular flange portion 28 of body 16. Internally, flange 28 may have an inner cylindrical surface 29 centered about axis 21 and of a diameter substantially greater than the diameter of the radially opposed external surface 30 of stud element 17, to enable the desired free pivotal and shifting movement of the stud relative to the body.

Element 17 has at its axially inner end an enlargement 31 which is circular and concentric about axis 21 except insofar as the enlargement is interrupted by a transverse passage 32 extending therethrough. More particularly, enlargement 31 may have an outer circular cross section surface 33, which tapers gradually and curves progressively as it advances axially inwardly (downwardly in FIG. 2), from an upper enlarged diameter portion 34 of the enlargement to a lower reduced end 35 of that portion of the stud. This taper or curvature is of a predetermined configuration enabling maximum swinging and shifting movement of the stud in a manner later to be discussed, without contacting interference of the lower portion of the enlargement 31 with inner wall surface 26 of body 16. The upper or axially outer surface 36 of enlargement 31 is annular and centered about axis 21 (in the illustrated centered position of the stud), and is curved spherically about a point 37 on that axis. This surface 36 is thus upwardly convex, and engages a downwardly convex correspondingly spherically curved annular surface 38 formed at the underside of a shiftable force transmitting washer or ring 39. Thus, as will be apparent, these contacting spherical surfaces 36 and 38 enable the stud to tilt or swing about axis 37 relative to the engaging ring 39, in any direction from the illustrated centered position of the stud, so that the axis of the stud may assume tilted positions such as those illustrated in broken lines at 39' and 40 (FIG. 2), in which the axis of the stud is disposed at an angle to the main axis 21 of body 16.

The reduced diameter external surface 30 of the stud may commence at the upper extremity of spherical surface 36, and extend upwardly to a location 140 at which the stud may return to a somewhat increased diameter external surface 41. Upward beyond surface 41, the stud has external threads 42 for engagement with a coacting nut or other part to be connected to the stud. As will be apparent, threads 42, surface 41, and surface 30 are all centered about the same axis as are surfaces 36 and 31, which axis coincides with main axis 21 of the body in the illustrated centered position of the stud.

Ring 39 has an upper transverse annular surface 43, disposed perpendicular to axis 21, and engageable with body surface 27 in a manner transmitting axially outward load forces to the body. Externally, the annular ring 39 has an outer cylindrical surface 44 centered about the axis of the stud, but of a diameter substantially smaller than the diameter of internal surface 26 of the body, so that the ring may shift laterally with the stud relative to the body, as to the position illustrated in broken lines in FIG. 2.

For preventing rotation of the stud relative to body 16, I provide a torque transmitting pin 45 (FIGS. 2 and 3), which may be externally cylindrical as seen clearly in FIG. 2, and is disposed and extends along an axis 46 which is perpendicular to and intersects main axis 21 of the device. This pin has its opposite ends connected to the side wall of body 16, as by extension of the ends of the pin 45 into aligned diametrically opposed openings 47 formed in the body side wall. The pin may be a pressed fit within openings 47, and may have its end surfaces 48 received essentially within the minor diameter of external threads 18, or at least far enough radially inwardly to avoid interference with carrier part threads 13. Pin 45 is loosely received within the previously mentioned transverse passage or slot 32 formed in enlargement 31 of the stud. This passage 32 may be defined by two parallel axially extending side wall surfaces 49, disposed equal distances at opposite sides of the main axis of the stud, and terminating upwardly at the location of a transverse planar axially outer wall surface 50 which is perpendicular to the axis of the stud. As will be apparent from FIG. 2, surfaces 42 are spaced apart a distance considerably greater than the diameter of the pin, to enable transverse shifting movement and swinging movement of the stud 17, while surface 50 is in the FIG. 2 position of the part spaced axially outwardly from the pin to further enable the pivotal or universal movement of the stud.

In using the device 10, the assembly may be installed by first screwing body 16 into threads 13 of the carrier part, and then driving the keys 19 axially to lock the body against unscrewing rotation. The carrier part may then be moved into a desired position for connection to another element, and a nut or other threaded part may be tightened onto threads 42 of the stud to secure the parts together. During such connection of the stud to the nut or other mating element, the stud is free for both lateral shifting (floating) movement transversely of axis 21, as permitted by shifting of ring surface 43 relative to body surface 27, and universal tilting and self-aligning movement of the axis of threads 42 relative to axis 21 of the body, as to the tilted positions represented at 39' and 40 in FIG. 2. Thus, the stud is capable of shifting to virtually any desired orientation with respect to body 16, and yet in any of the possible positions of the stud axially outward load forces are transmitted from enlargement 17 of the stud to body 16 along force transmission areas extending annularly entirely about the stud and about axis 21. Consequently, the outward load forces are applied from the stud to the body in optimum manner, to avoid any distortion of or damage to the outer body or its threads in any relative orientation of the parts.

When a nut or other element is tightened onto threads 42 of the stud, rotary forces are transmitted from the stud to the body through engagement of surfaces 49 on enlargement 31 of the stud with pin 45, so that the stud cannot turn relative to the body, and an effective tightening action of the nut on the stud can be attained.

FIG. 5 is a view similar to FIG. 3, but showing a variational form of the invention, which may be identical with that of FIGS. 1–4 except for the provision of a small take-up spring 51 in the device. This coil spring may be received and confined within a cylindrical bore 52 formed in the axially inner end of stud 17a and having a generally transverse end wall 53 against which the spring bears upwardly. The lower end of the spring bears downwardly or axially inwardly against a central portion of pin 45a, and thus takes up looseness between stud 17a and washer 39a and body 16a in all positions of the stud, to maintain surfaces 36a and 38a, and surfaces 43a and 27a, always in contact, without in any way limiting the freedom of movement of the stud. As will be apparent, bore 52 and spring 51 are desirably centered about the longitudinal axis of the stud (which is coincident with axis 21a of the body in the illustrated centered position of the stud).

I claim:

1. A fastener assembly comprising an outer body element to be connected to a carrier part, a self-aligning second element movably carried by said body element, said self-aligning element having a shank portion projecting axially outwardly from and beyond said body element and carrying external threads beyond the body element which are disposed about an axis and to which another member may be connected to secure said member to the carrier part through the medium of said fastener assembly, said self-aligning element being free for universal movement relative to said body element to tilt said axis of the threads in different directions relative to the body element, an essentially annular load transmitting part disposed about said shank portion and shiftable laterally relative to the body element so that said self-aligning element may both shift transversely and tilt relative to the body element, there being two interengaging relatively movable shoulders on said self-aligning element and said load transmitting part for transmitting axially outward load forces, said shoulders being curved essentially spherically and engaging in a universal relation so that said shoulders effectively transmit said load forces when the axis is tilted in said different directions, said load transmitting part and said body element having interengaging additional shoulders about said shank portion which are substantially planar and transverse to transmit axially outward forces from said load transmitting part to the body element in different positions to which the former is laterally shiftable, said body element having a generally tubular side wall extending about an enlarged axially inner portion of said self-aligning element and having external threads to be screwed into said carrier part, said side wall containing diametrically opposed apertures, and a pin extending generally transversely across the interior of said body element and having its opposite ends connected into said apertures, said enlarged portion of said self-aligning element containing a passage which extends generally transversely of said axis and through which said pin extends in loosely fitting relation, said passage having generally axially extending opposite side walls engageable with the pin in a relation preventing rotation of the self-aligning element relative to the body element but spaced apart sufficiently to allow said shifting and tilting movement, said passage having an axially outer wall engageable with the pin to prevent axially inward withdrawal of the self-aligning element from said body element and spaced from the pin to allow said tilting movement, said passage being open at its axially inner side.

2. A fastener assembly as recited in claim 1, including a coil spring contained within a recess in said enlarged portion of the self-aligning element and bearing axially inwardly against said pin to yieldingly urge said self-aligning element axially outwardly.

3. A fastener assembly comprising an outer body to be connected to a carrier part, a self-aligning element movably carried by said body and having threads disposed about an axis and to which another threaded member may be connected to secure said member to the carrier part through the medium of said fastener assembly, said element being free for universal movement relative to said body to tilt said axis of the threads in different directions relative to the body, means forming two interengaging relatively movable shoulders for transmitting axially outward load forces from said self-aligning element to said body, at least one of said shoulders being curved essentially spherically and engaging the other shoulder in a universal relation so that said shoulders effectively transmit said load forces when the axis is tilted in said different directions, said body being hollow and having a generally tubular side wall extending about a portion of said self-aligning element in close proximity thereto, a pin extending generally transversely across the interior of said body and connected at its opposite ends to said side wall of the body, means on said portion of the self-aligning element engageable with said pin within the body in a relation preventing rotation of said self-aligning element relative to said body while allowing said tilting movement thereof, and a spring interposed operatively between said pin and said self-aligning element and yieldingly urging the latter axially outwardly relative to the pin and body.

4. A fastener assembly comprising an outer body to be connected to a carrier part, a self-aligning second element movably carried by said said body, said self-aligning element having a shank portion projecting axially outwardly from and beyond said body and carrying external threads beyond the body which are disposed about an axis and to which another member may be connected to secure said member to the carrier part through the medium of said fastener assembly, said self-aligning element having an enlarged portion at the axially inner end of said shank portion, said self-aligning element being free for universal movement relative to said body to tilt said axis of the threads in different directions, and being free also for bodily lateral shifting movement generally transversely of said axis relative to the body, an essentially annular load transmitting part disposed about said self-aligning element at the juncture of said shank portion and said enlarged portion thereof, a first pair of interengaging relatively movable shoulders on said self-aligning element and said load transmitting part for transmitting axially outward load forces therebetween, a second pair of interengaging relatively movable shoulders on said load transmitting part and said body to transmit said load forces therebetween and disposed essentially about said sank portion of the self-aligning element, said shoulders of one pair being relatively shiftable laterally to enable said bodily lateral shifting movement of said self-aligning element, at least one shoulder of the other pair being curved essentially spherically and engaging the other shoulder of that pair in a universal relation so that said shoulders effectively transmit load forces when said axis is tilted in different directions, said body having a generally tubular side wall extending about said enlarged portion of said self-aligning element and having external threads to be screwed into said carrier part, said side wall containing two apertures at essentially opposite sides thereof, and a pin extending generally transversely across the interior of said body having its opposite ends connected into said apertures, said enlarged portion of said self-aligning element containing a passage which extends generally transversely of said axis and through which said pin extends in a loosely fitting relation enabling said universal tilting movement and said bodily lateral shifting movement, said passage having opposite side walls engageable with the pin in a relation preventing rotation of the self-aligning element relative to the body but spaced apart sufficiently to allow said tilting and shifting movements.

References Cited
UNITED STATES PATENTS

| | | | |
|---|---|---|---|
| 1,295,937 | 3/1919 | Stafford et al. | 85—32 |
| 2,544,387 | 3/1951 | Kerr | 151—41.76 |
| 2,672,848 | 3/1954 | Brill | 151—41.7 |
| 2,696,139 | 12/1954 | Attwood | 151—41.75 |
| 2,820,499 | 1/1958 | Schaaf | 151—41.7 |
| 3,020,946 | 2/1962 | Mills | 151—41.71 |
| 3,130,765 | 4/1964 | Neuschotz | 151—23 |
| 3,177,916 | 4/1965 | Rosan | 151—41.73 |
| 3,247,878 | 4/1966 | Rosan et al. | 151—41.73 |
| 2,481,972 | 9/1949 | Betts | 151—41.7 |

EDWARD C. ALLEN, *Primary Examiner.*